(12) United States Patent
Folk

(10) Patent No.: US 8,550,101 B2
(45) Date of Patent: Oct. 8, 2013

(54) SYSTEM AND METHOD FOR HYDRAULICALLY MANAGING FLUID PRESSURE DOWNSTREAM FROM A MAIN VALVE BETWEEN SET POINTS

(75) Inventor: Robert Folk, Costa Mesa, CA (US)

(73) Assignee: Cla-Val Co., Costa Mesa, CA (US)

( * ) Notice: Subject to any disclaimer, the term of this patent is extended or adjusted under 35 U.S.C. 154(b) by 0 days.

(21) Appl. No.: 13/240,036

(22) Filed: Sep. 22, 2011

(65) Prior Publication Data

US 2012/0006413 A1 Jan. 12, 2012

Related U.S. Application Data

(62) Division of application No. 11/927,474, filed on Oct. 29, 2007, now Pat. No. 8,091,582.

(60) Provisional application No. 60/911,604, filed on Apr. 13, 2007.

(51) Int. Cl.
*F16K 31/128* (2006.01)

(52) U.S. Cl.
USPC ............. 137/14; 137/489; 137/492.5; 251/35

(58) Field of Classification Search
USPC ............. 137/14, 489, 492, 492.5; 251/29, 35
See application file for complete search history.

(56) References Cited

U.S. PATENT DOCUMENTS

| | | |
|---|---|---|
| 2,230,914 A | 2/1941 | Sherman |
| 2,235,304 A | 3/1941 | Toussaint |
| 2,399,938 A | 6/1944 | Pett |
| 2,536,184 A | 1/1951 | Johnson |
| 2,543,846 A | 3/1951 | Griswold |
| 2,599,534 A | 6/1952 | Annin |
| 2,991,796 A | 7/1961 | Griswold |
| 3,125,319 A | 3/1964 | Arbogast et al. |
| 3,136,333 A | 6/1964 | Griswold |
| 3,168,901 A | 2/1965 | Murakami |
| 3,185,344 A | 5/1965 | Kenney |
| 3,302,531 A | 2/1967 | Arbogast et al. |
| 3,428,063 A | 2/1969 | Plotkin et al. |
| 3,592,223 A | 7/1971 | Reese |
| 3,669,143 A | 6/1972 | Reese |
| 3,875,957 A | 4/1975 | Veit et al. |
| 4,143,850 A | 3/1979 | Brakebill |
| 4,553,732 A | 11/1985 | Brundage et al. |
| 4,565,349 A | 1/1986 | Tomlin |
| 4,697,616 A | 10/1987 | Ashcroft |
| 5,183,074 A | 2/1993 | Reese |

(Continued)

FOREIGN PATENT DOCUMENTS

| EP | 0321774 A2 | 6/1989 |
|---|---|---|
| GB | 2166567 A | 5/1986 |

*Primary Examiner* — William McCalister
(74) *Attorney, Agent, or Firm* — Kelly & Kelley, LLP

(57) ABSTRACT

A system for hydraulically managing fluid pressure between selected set points includes a pilot control system operably coupled to a main valve. The pilot control system includes at least one fluid conduit, a variable orifice assembly, and a control pilot valve apparatus. Fluid is passed through a fixed orifice and into a first chamber of the control pilot valve apparatus. Fluid is passed through the variable orifice of the variable orifice assembly and into a second chamber of the control pilot valve apparatus. The main valve is hydraulically opened or closed in response to a pressure differential between the first and second chambers of the control pilot valve apparatus so as to manage fluid pressure downstream of the main valve between the selected upper and lower set points.

7 Claims, 12 Drawing Sheets

(56) References Cited

U.S. PATENT DOCUMENTS

| | | |
|---|---|---|
| 5,348,036 A | 9/1994 | Oksanen et al. |
| 5,393,035 A | 2/1995 | Steele |
| 5,460,196 A | 10/1995 | Yonnet |
| 5,555,910 A | 9/1996 | Powell et al. |
| 5,816,286 A | 10/1998 | Scott et al. |
| 5,967,176 A | 10/1999 | Blann et al. |
| 6,056,008 A | 5/2000 | Adams et al. |
| 6,354,319 B1 | 3/2002 | Mooney |
| 6,595,237 B2 | 7/2003 | Cecchinato et al. |
| 6,752,169 B2 | 6/2004 | Callies |
| 7,066,710 B2 | 6/2006 | Wiggins et al. |
| 2003/0111627 A1 | 6/2003 | Winslow |

SYSTEM AND METHOD FOR HYDRAULICALLY MANAGING FLUID PRESSURE DOWNSTREAM FROM A MAIN VALVE BETWEEN SET POINTS

BACKGROUND OF THE INVENTION

The present invention generally relates to automatic valves employed on municipal water utility systems. More particularly, the present invention relates to a hydraulically adjustable pressure management control valve designed to control downstream pressure between selected set points.

There is a general understanding throughout the worldwide water supply industry that instances of water loss are common in many water distribution networks and in many instances the level of water loss can be relatively high. The amount of water loss in the system is due to a variety of leak sources, such as improperly tightened pipe flange connections, leaking flange gaskets, leaking valve seals, failed seals, old pipes (with pinhole bursts), loose fittings, leaky faucets, etc. The sum of these sources of leakage can add up to a substantial amount of water loss. Maintaining the entry point pressure at all times at the level necessary to provide adequate pressure at the distant points for periods of high demand can result, during periods of low demand, in excessive pressure at the consumer's premises, and thus increased waste of water by unnecessary consumption and leakage. The volume of water lost through leakage is directly related to pressure in the system.

Automatic pressure reducing valves are used in water distribution systems to reduce pressure to a pre-determined value or sub-point that is adequate, but does not expose normal components, such as household hot water tanks, to overpressure. The sub-point is typically determined to provide minimum pressure that meets criteria of the water utility, particularly under maximum or "peak" demand conditions which can occur when a fire is being fought. The pressure required for peak demand is usually significantly higher than that required for "off-peak" or typical nighttime conditions. Under low demand conditions, not only does leakage form a higher proportion of the total demand, but investigation has implied that some leak orifices can actually increase in area with pressure, aggravating the problem if excessive pressures are maintained at all times.

Various attempts have been previously made to reduce such losses by introducing a degree of control over the supply pressure in response to demand. One known system uses electrical circuit means with pressure and flow-rate sensors from monitoring pressure and flow-rate and then processing the information obtained and using it in turn to control suitable electrically operated valve means. Such systems are, however, relatively complex and expensive and require a continuous external power supply giving rise to additional capital and running costs and reliability problems.

There also exist flow-driven valves which use fluid pressures to control actuation of the main valve, and thus are independent of external power sources and can be used in essentially any location. One such flow-driven valve system is disclosed in U.S. Pat. No. 5,967,176 to Blann, et al. The system controls high and low pressures by utilizing the pressure drop across an orifice plate that is installed in the main line, usually attached directly to the inlet or outlet flange of the main valve. The pressure control is independent of the main valve position, and is a direct function of system flow. The pressure control device monitors the pressure drop or flow across the orifice plate. Control pressure is varied based upon the movement of a pilot valve member with respect to a fixed pilot valve member, which in turn controls the main control valve.

However, this system has many shortcomings. The diameter of the orifice plate may need to be customized for different high/low flow applications. For example, a smaller orifice diameter may be required if flows are not sufficient to develop the required pressure drop across the system orifice. Likewise, the system orifice may need to be increased if pressure drops are too large because a smaller orifice can limit the flow capacity of the system. The orifice plate also decreases the capacity of the main valve. This is particularly a concern when high flow is necessary, such as a high flow of water to fight a fire or the like. The added orifice plate limits the capacity of the main valve for fire flow situations. Moreover, it is difficult to retrofit existing valves with this system as the flange spacing must be modified to accommodate the orifice plate, typically requiring removal of the main valve from the line.

Accordingly, there is a continuing need for an improved flow-driven valve system for automatically controlling downstream pressure between selected set points. The present invention fulfills these needs and provides other related advantages.

SUMMARY OF THE INVENTION

The present invention resides in a system and method for hydraulically managing fluid pressure between selected set points. As will be more fully described herein, the system is flow-driven and responds to changing flow demand downstream from a main valve, so as to manage and control the fluid pressure downstream from the main valve between predetermined set points.

The system generally comprises a main valve having a main valve body defining a fluid inlet and a fluid outlet. A main valve seat is disposed between the fluid inlet and the fluid outlet. A main valve member is movable between an open position away from the main valve seat, and a closed position engaging the main valve seat. The main valve is configured to hydraulically open to increase fluid flow therethrough, and hydraulically close to reduce fluid flow therethrough. A main valve diaphragm is coupled to the main valve member. The main valve diaphragm and the main valve body, or a cover thereof, define a control chamber having a control port in fluid communication with a pilot control system.

The pilot control system is operably coupled to the main valve and has at least one fluid conduit for passing fluid through a fixed orifice and into a first chamber of a control pilot valve apparatus, and for passing fluid through a variable orifice assembly defining a variable orifice and into a second chamber of the control pilot valve apparatus.

The variable orifice assembly comprises a housing associated with the valve, and defines a fluid inlet and outlet. A stem is connected to the valve member and slidably disposed within the housing. Movement of the stem within the housing creates a variable fluid orifice between the fluid inlet and the fluid outlet of the housing.

The variable orifice assembly stem may include a fluid inlet in fluid communication with the fluid inlet of the housing, and a fluid outlet variably in fluid communication with the fluid outlet of the housing as the stem is moved. In another embodiment, a sleeve is disposed between the housing and the stem. The sleeve has an aperture in fluid communication with the housing fluid outlet. The stem is adapted to variably permit fluid to pass from the housing fluid inlet to the sleeve aperture, and the housing fluid outlet. Preferably, the sleeve is adjustably positioned within the housing to vary the fluid flow from the housing fluid inlet to the housing fluid outlet.

At least one fluid conduit includes a first inlet disposed upstream of the main valve seat and in fluid communication with the fixed orifice and the variable orifice assembly. A second inlet is disposed downstream of the main valve seat, the second inlet being in fluid communication with the first chamber of the control pilot valve apparatus.

A pressure regulator apparatus may be disposed between the fluid conduit inlet and the fluid inlet of the variable orifice assembly to customize and regulate the pressure entering into the variable orifice assembly. The pressure regulator comprises a housing having a fluid inlet and a fluid outlet. A selectively adjustable fluid passageway is disposed between the fluid inlet and fluid outlet.

The control pilot valve apparatus generally comprises a housing having a first flexible diaphragm disposed therein and defining a first variable chamber above the first flexible diaphragm. The first variable chamber has a fluid inlet and a fluid outlet. A movable yoke is attached to the first flexible diaphragm. A second flexible diaphragm is disposed within the housing in spaced relation to the first flexible diaphragm, and defines a second variable chamber below the second flexible diaphragm. The second variable chamber has a fluid inlet. A stem is attached to the second flexible diaphragm and slidably disposed relative to the yoke. The yoke and stem cooperatively form a variable fluid passageway between the inlet and the outlet of the first variable chamber.

Typically, the stem includes an aperture variably alignable with a yoke aperture such that as the yoke and stem move relative to one another, they cooperatively define the variable fluid passageway.

The movement of the stem is limited to a selected range defining a lower pressure set point. Typically, such means includes an adjustable spring assembly for adjusting the movement of the stem to the selected range defining the lower pressure set point. Similarly, the movement of the yoke is limited to a selected range so as to define an upper pressure set point. Typically, such means includes an adjustable spring assembly for adjusting the movement of the yoke to the selected range defining the upper pressure set point.

The pilot control system hydraulically opens or closes the main valve in response to a pressure differential between the first and second chambers of the control pilot valve apparatus, so as to manage fluid pressure downstream of the main valve between the selected upper and lower set points.

A method of controlling fluid flow through a main valve to maintain downstream pressure between pre-determined set points in accordance with the present invention comprises the steps of generating a fluid stream having a pressure proportional to an inlet pressure of the main valve. A first portion of the fluid stream is passed through a fixed orifice and into the first chamber of the control pilot valve apparatus above the flexible diaphragm thereof. A second portion of the fluid stream is passed through the variable orifice assembly and into the second chamber of the control pilot valve apparatus below the flexible diaphragm. A pressure differential between the first and second chambers of the control pilot valve apparatus is detected, resulting in the hydraulic opening or closing of the main valve by transmitting a fluid stream into the control chamber of the main valve. The fluid passageway of the variable orifice is automatically altered in response to the opening and closing of the main valve.

The second portion of the fluid stream may be passed through the pressure regulator passageway before passing the second portion of the fluid stream through the variable orifice. The pressure regulator passageway may be adjusted in order to modify a pressure regulation profile.

A lower pressure set point is set by selectively limiting a range of travel of the flexible diaphragm of the control pilot valve apparatus. An upper pressure set point is set by selectively limiting a range of travel of a second, or upper, flexible diaphragm of the control pilot valve apparatus which is disposed above the first chamber.

A second fluid stream is generated which has a pressure proportional to an outlet of the main valve. This second fluid stream is placed in fluid communication with the first chamber of the control pilot valve apparatus.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
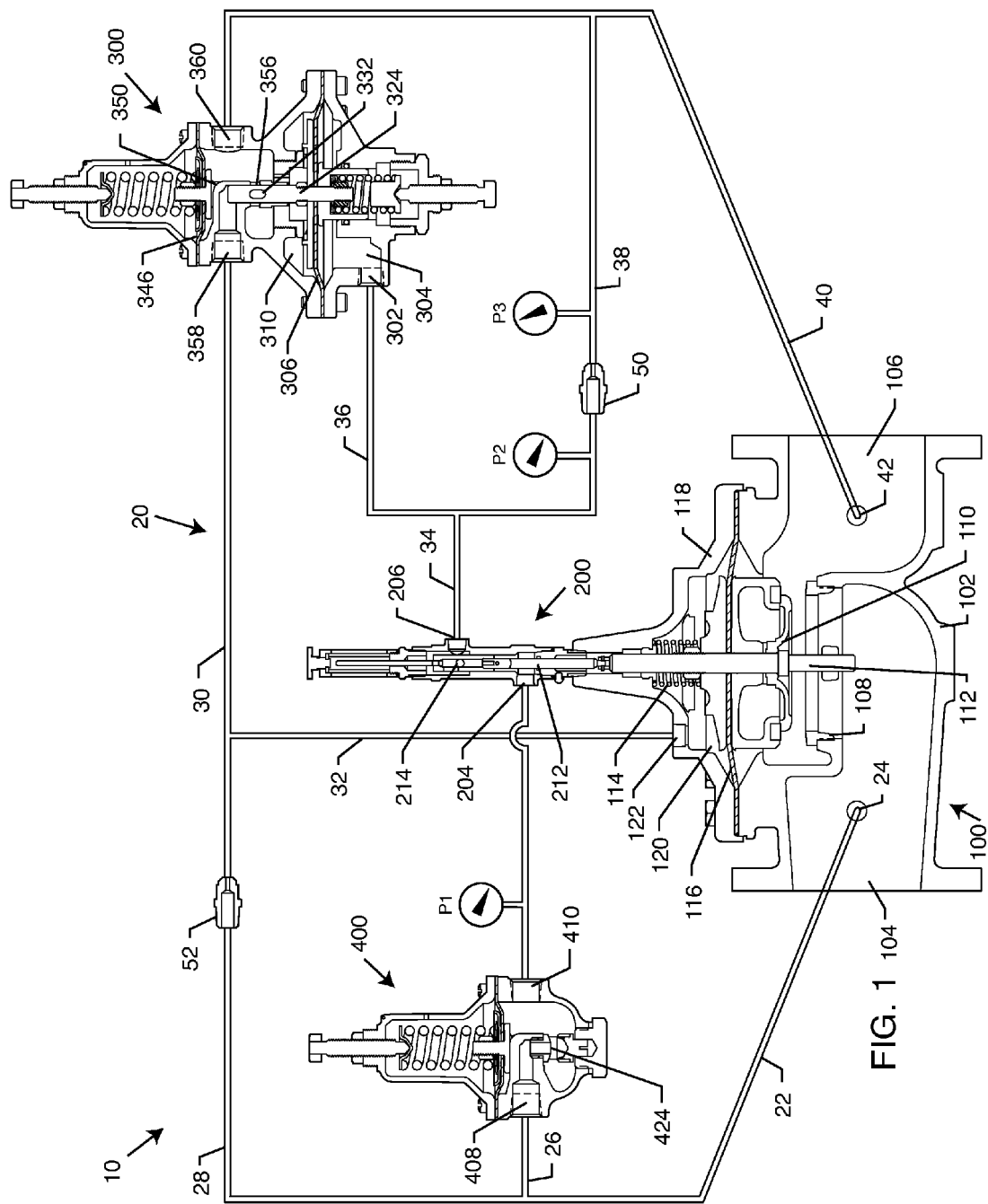
FIG. 1 is a schematic illustration of a system in a high fluid flow state for hydraulically managing fluid pressure downstream of a main valve between selected set points, in accordance with the present invention.

As shown in the accompanying drawings, for purposes of illustration, the present invention is directed to an adjustable hydraulically operated pressure management control valve system 10. As will be more fully described herein, the system 10 of the present invention is primarily intended for use in the waterworks industry where there is a desire to reduce the amount of water loss in the system due to leaks. The invention can reduce the amount of water loss in a system by reducing the system pressure as the flow or system demand decreases. A common example would be a residential water system where water demand is high during the day and low at night. If the pressure is lower during low usage, then a lower pressure will result in lower water losses throughout the system.

As will be more fully described herein, the system 10 of the present invention comprises a main valve assembly 100 operably coupled to a pilot control system 20. The pilot control system 20 includes a variable orifice assembly 200, a control pilot valve apparatus 300, and an optional pressure regulator apparatus 400. Various conduits 22-42 fluidly couple these components and provide pressurized fluid streams, as will be more fully described herein. The pilot control system 20 hydraulically opens the main valve assembly 100 during high demand conditions, and closes the main valve assembly 100 during low demand conditions, resulting in a reduction of the amount of water loss in a waterworks system downstream of the main valve assembly 100.

Figure 2:
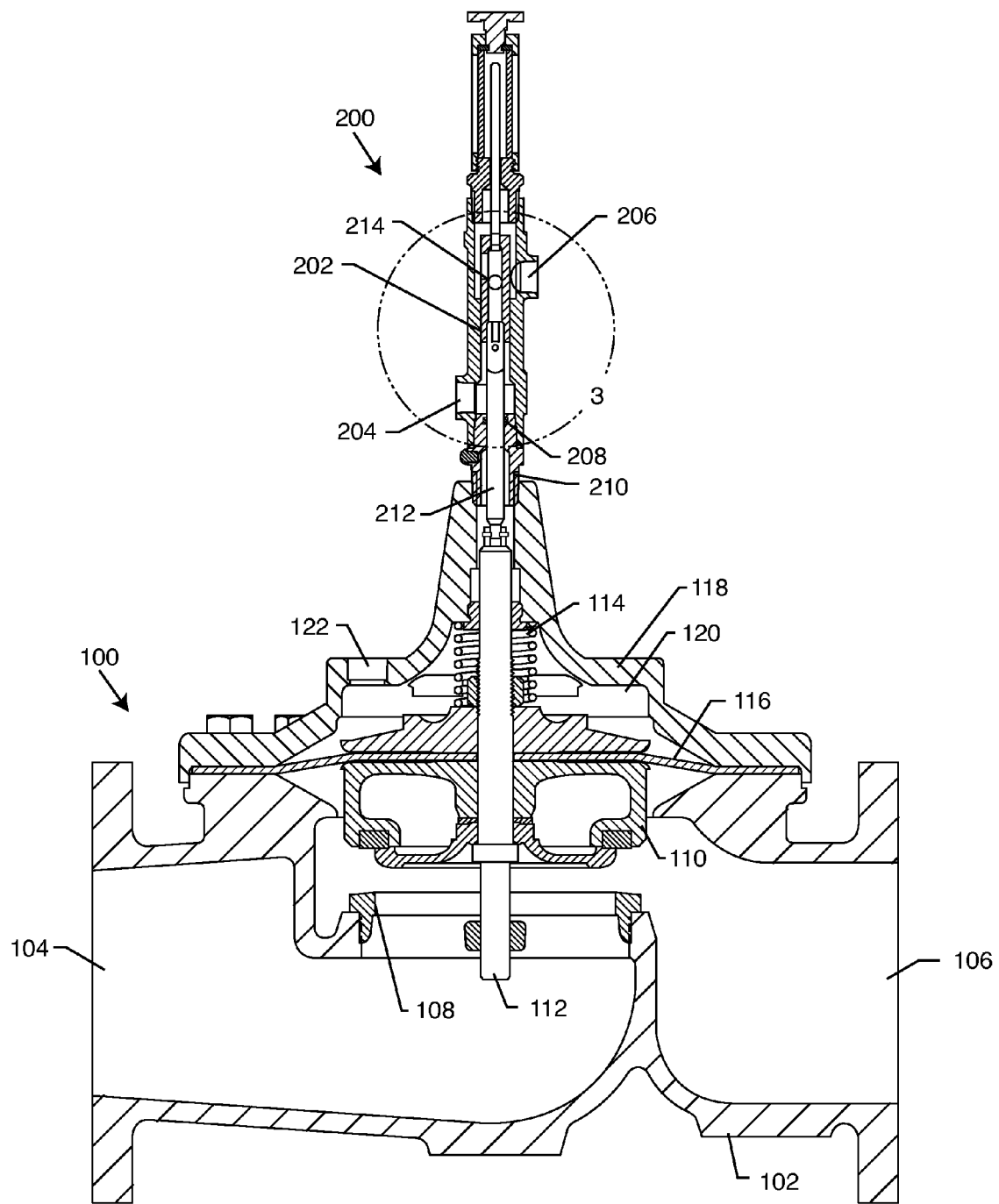
FIG. 2 is a cross-sectional view of a main valve and a variable orifice assembly positioned in a high flow state, in accordance with the present invention.

With reference now to FIGS. 1 and 2, the main valve 100 is comprised of a main valve body 102 defining an inlet 104 and an outlet 106. Intermediate the main valve inlet and outlet 104 and 106 is a main valve seat 108. A main valve member is movable between an open position away from the main valve seat 108, as illustrated in FIG. 1, and a closed position engaging the main valve seat 108. The main valve member 110 includes a movable stem 112 for guiding the main valve member 110 into and out of engagement with the main valve seat 108. A spring 114 is typically also implemented in facilitating and guiding the main valve member 110 movement. A main valve diaphragm 116 is coupled to the main valve member 110 and extends between the main valve body 102 and a cover 118 of the main valve 100 so as to define a fluid control chamber 120 between the diaphragm 116 and the cover 118, or other portion of the body 102. The control chamber includes an inlet port 122 for fluid coupling with the pilot control system 20, such as through conduit 32.

As will be more fully explained herein, the pilot control system 20 increases fluid flow into the control chamber 120 during low flow or low demand situations, causing the main valve member 110 to move downwardly towards engagement with the main valve seat 108. Conversely, during high flow or high demand situations, less fluid is directed into the fluid control chamber 120, resulting in a lower pressure and enabling the main valve member 110 to move away from the main valve seat 108 into an open position so as to permit more fluid to flow through the main valve 100.

With reference again to FIG. 1, conduit 22 has an inlet 24 disposed upstream of the main valve seat 108 and main valve member 110, typically adjacent to the inlet 104 of the main valve assembly 100. A fluid stream having a pressure proportional to the fluid stream at the inlet 104 of the main valve 100 is generated. A portion of the fluid stream is diverted into conduit 26 and through the variable orifice assembly 200. As will be more fully described below, the portion of the fluid stream passing through conduit 26 may first pass through a pressure regulator device 400 so as to control the profile of the pressure regulation ramp and maintain pressure stability to the inlet 200 when regulating between low and high pressure set points.

With reference now to FIG. 2, in one embodiment the variable orifice assembly 200 includes a housing 202 defining a fluid inlet 204 and a fluid outlet 206. Typically, the housing 202 is coupled to the main valve cover 118, as illustrated. However, fluid pressures within the variable orifice assembly housing 200 and the main valve 100 are isolated from one another, such as by utilizing an O-ring 208 in an adapter 210 which isolate the pressure within the housing 202 and the main valve control chamber 120.

Figure 3:
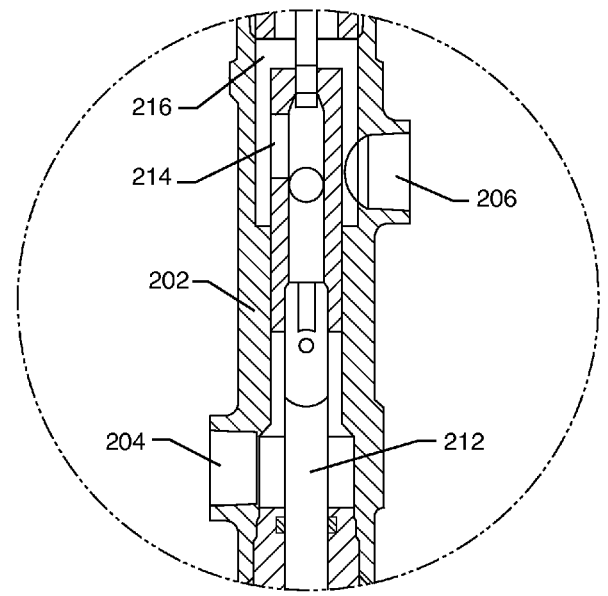
FIG. 3 is an enlarged cross-sectional view of area "3" of FIG. 2, illustrating a variable orifice thereof in an open position.

A stem 212 is movably disposed within the housing 202, and coupled to the stem 112 of the main valve member 110. In this manner, as the main valve member 110 moves up and down, the stem 212 of the variable orifice assembly 200 also moves up and down. The housing 202 and the stem 212 cooperatively define a variable orifice 214. For example, typically the stem 212 is at least partially hollow and includes an aperture or slit therein. As illustrated in FIG. 3, when the stem 212 is raised upwardly, the variable orifice 214 is in fluid communication with the outlet 206, such as by an intermediate chamber 216.

Figure 4:
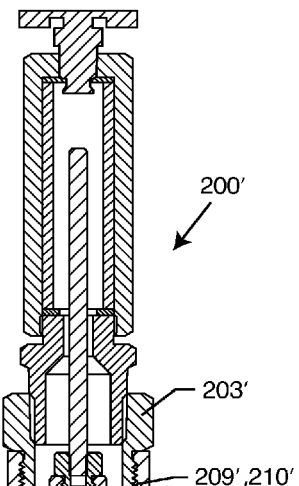
FIG. 4 is a cross-sectional view of an alternative variable orifice assembly embodying the present invention.

With reference now to FIG. 4, an alternative variable orifice assembly 200' is shown which is capable of being adjusted so as to customize a pressure regulation curve, between set points, to set the application preferences of the user. In this embodiment, the assembly 200' also includes a housing 202' which is connected to the main valve member, typically the cover member 118, such as by threaded connection 201'. A stem 212' is connected to the main valve member stem 112, as discussed above, and includes an adapter 210' with an O-ring 208' to create a leak-free connection so as to separate pressures therebetween. The housing 202' includes a fluid inlet 204' and a fluid outlet 206'.

Figure 5:
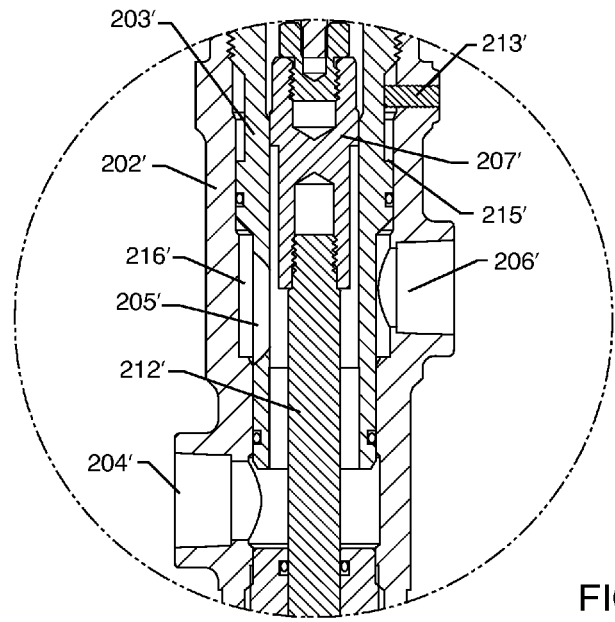
FIG. 5 is an enlarged cross-sectional view taken generally along area "5" of FIG. 4, illustrating the variable orifice in an open position.

In this case, however, the stem is not hollow. Instead, the housing 202' is adapted so as to receive a sleeve 203' between the inner wall of the housing 202' and the stem 212'. As illustrated in FIGS. 4 and 5, the sleeve 203' includes an aperture, typically in the form of a slit 205', which is in fluid communication with an intermediate chamber 216' of the housing 202', which is in fluid communication with the outlet 206'. A section 207' of the stem is configured so as to have a greater diameter towards an upper portion thereof, or a shoulder which may include an O-ring or the like, and be of reduced diameter, or include external passageways or the like, in a lower portion thereof such that when the stem 212' is raised sufficiently, the reduced diameter profile of the section 207' is in alignment with the slot 205' of the sleeve 203', permitting fluid to flow from the housing inlet 204', around the stem section 207', through the sleeve slot 205', into the intermediary chamber 216', and out outlet 206'.

It will be readily appreciated by those skilled in the art that the slot 205' can be created so as to create a pressure regulation profile by increasing or decreasing the fluid flow therethrough. Similarly, the exterior configuration of the stem section 207' can be modified to correlate to increased or decreased fluid flow. However, these techniques do not allow adjustment after the assembly 200' has been manufactured and assembled.

Figure 13:
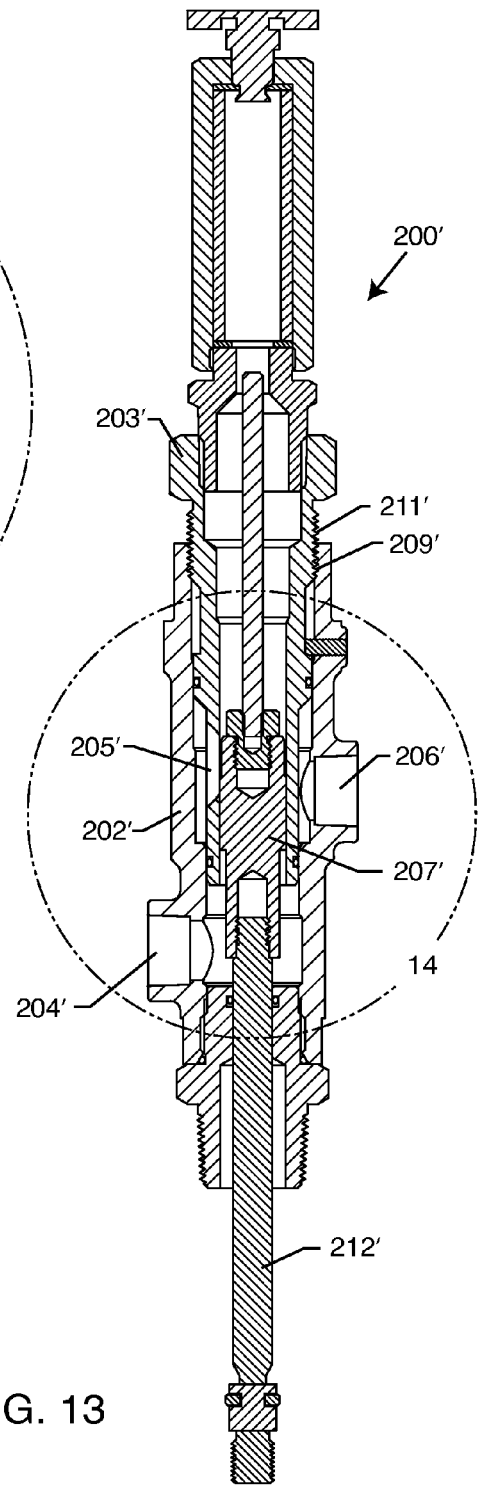
FIG. 13 is a cross-sectional view of the variable orifice assembly of FIG. 4, but illustrating the variable orifice in a closed position.

Thus, with reference to FIGS. 4, 5 and 13, the sleeve 203' is adjustably inserted and connected to the housing 202', such as by threaded connection between the internal threads 209' and external threads 211' of the housing 202' and sleeve 203', respectively. This allows the sleeve 203' to be raised or lowered, thus adjusting the position of the sleeve slot 205', and thus requiring a greater or lesser stroke of the main valve stem 112 so as to open or close the variable orifice between the variable orifice assembly inlet 204' and outlet 206'.

The travel of the sleeve 203' may be limited, for example, by the use of a set screw 213' which is disposed above a shoulder 21 5' of the sleeve 203'. Also, this serves as a precautionary feature so as to not permit the user to inadvertently unthread the sleeve 203' to the point where the variable orifice assembly 200' does not function. It will be appreciated that the adjusting position of the sleeve aperture 205' can be used to change or customize the pressure curve profile between the low and high flow set points of the system.

With reference again to FIG. 1, when the stem 212 of the variable orifice assembly 200 is raised so as to open the variable orifice and permit fluid to flow therethrough, the fluid passes into conduit 34 and is split such that a portion of the fluid is passed through a fixed orifice device 50 through conduit 38 which is fluidly coupled to the control pilot valve apparatus 300, and another portion is passed through conduit 36 and into the control pilot valve apparatus 300.

Figure 6:
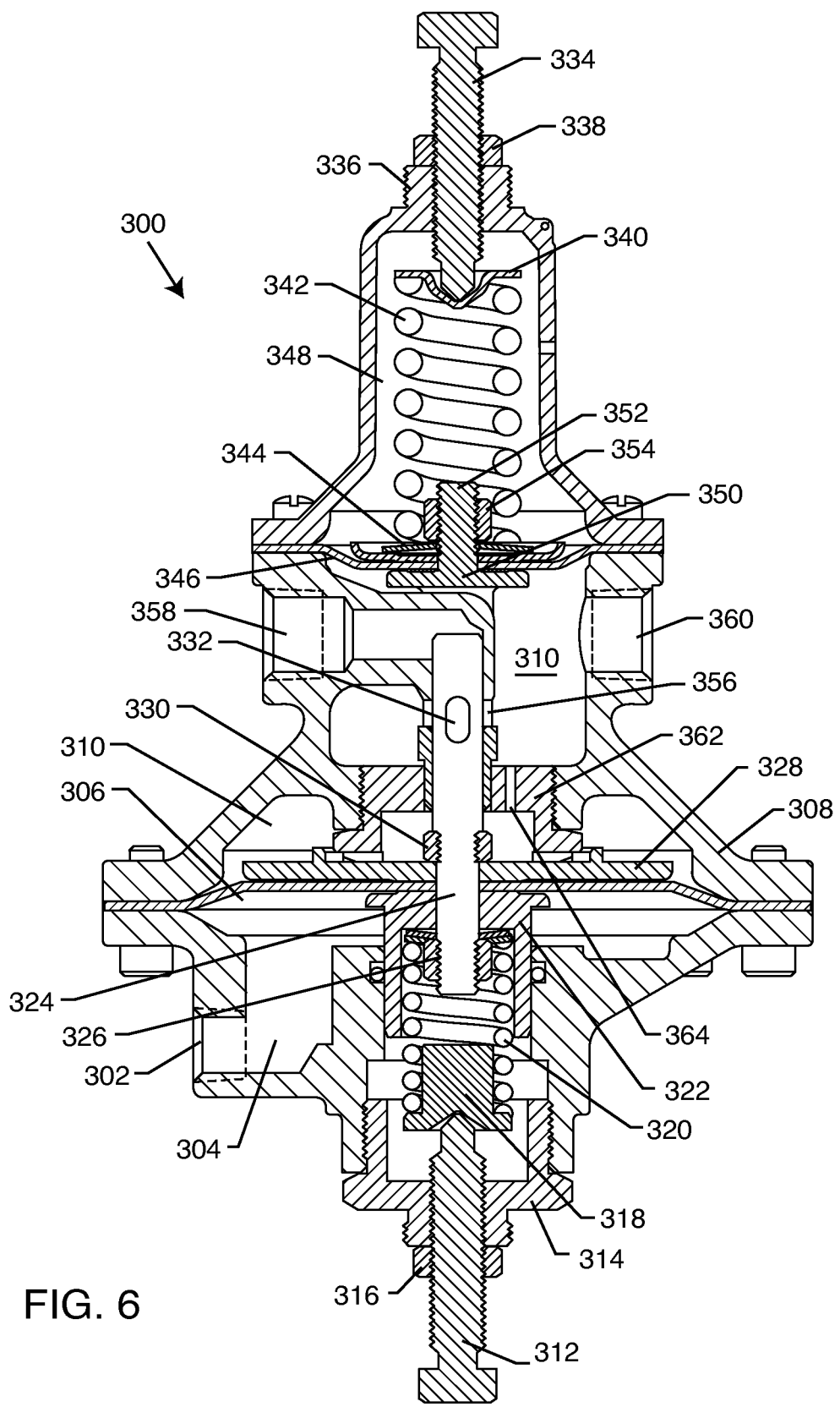
FIG. 6 is a cross-sectional view of a control pilot valve apparatus used in accordance with the present invention, in a high flow state.

More particularly, with reference to FIG. 6, the control pilot valve apparatus 300 includes an inlet port 302, fluidly coupled to conduit 36, leading to a lower, or second, chamber 304 thereof. A flexible diaphragm 306 extends across the housing 308 and divides the lower chamber 304 from an upper chamber 310. As will be more fully described herein, it is the pressure differential between the first, or upper, chamber 310 and the second, or lower, chamber 304 which results in the hydraulic opening and closing of the main valve 100.

The control pilot valve apparatus 300 includes a low pressure adjustment screw 312 threadedly connected to an end member 314 and having a stop nut 316 threadedly attached thereto. The end of the screw 312 engages a guide 318, supporting a spring 320. The spring is contained within a piston 322 such that the spring 320 exerts a force on the piston 322.

A stem 324 is connected to the piston 322, such as by use of a nut 326 and a threaded end of the stem 324 extending into the body of the piston 322. The stem 324 also extends through the diaphragm 306 and a washer 328 disposed on a top surface of the diaphragm 306. An upper nut 330 may be threaded onto the stem 324, or a shoulder formed in the stem. The lower and upper nuts 326 and 330 sandwich and couple the piston 322, the diaphragm 306, the stem 324, and the washer 328 to one another. Thus, if any of these components are moved, such as due to the force of the spring 320 or the fluid pressure in chamber 304, the connected members also move. An upper portion of the stem 324 is hollow, and includes an aperture or slot 332 therein.

A high pressure adjustment screw 334 threadedly extends through an upper member 336 of the body and includes a stop nut 338. The end of the high pressure adjustment screw 334 is in contact with an upper spring guide 340 which acts upon an upper spring 342. The spring 342 extends between the upper guide 340 and a washer 344 coupled to an upper, and typically smaller, diaphragm 346. The upper diaphragm 346 is disposed above the upper or first chamber 310, and a chamber 348 having atmospheric pressure.

A yoke 350 has a threaded end 352 with a nut 354 which couples the yoke 350 to the upper diaphragm 346 and washer 344. The yoke 350 includes a passageway or opening 356. The yoke passageway 356 and the stem slot 332 are alignable with one another so as to permit fluid to flow through an inlet 358 of the control pilot valve apparatus and into the first chamber 310, and out an outlet 360. The stem 324 and the yoke 350 are slidably nested or otherwise arranged so that they independently move, yet cooperatively define a variable fluid passageway between the inlet 358 and outlet 360. It will be appreciated that depending upon the position of the stem 324 and the yoke 350, the stem slot 332 and yoke aperture 356 are either completely aligned with one another, partially aligned with one another so as to restrict flow therethrough, or completely non-aligned so as to prevent fluid flow into and through the first upper chamber 310 of the control pilot valve apparatus 300.

Typically, a coupling member or stem guide 362 has an orifice or passageway therethrough 364 to permit fluid flow between an upper portion of the first chamber 310 adjacent to the inlet and outlet 358 and 360, and a lower portion of the upper or first chamber 310 immediately above the lower diaphragm 306. Thus, fluid pressure in the upper or first chamber 310 can act upon both the lower diaphragm 306 and the upper diaphragm 346 of the control pilot valve apparatus 300.

With reference again to FIG. 1, a high demand or high flow situation is illustrated. A fluid stream is generated through inlet 24, and passed through conduit 22. A portion of the stream is passed through conduit 28, through fixed orifice device 52. From there, this portion of the stream is fluidly coupled through conduits 30 and 32 to the inlet 358 of the control pilot valve apparatus 300 and the control chamber 120 of the main valve 100. Another portion of the fluid stream is directed through conduit 26 and into the inlet port 204 of the variable orifice assembly 200. In the high flow/high demand situation, the main valve seat 110 is opened and moved away from the valve seat 108. Thus, as the stem 112 of the main valve 100 is moved upwardly, the stem 212 of the variable orifice assembly 200 is moved as well, exposing to an increasing level the variable orifice 214 until the variable orifice 214 presents a maximum passageway for fluid to flow therethrough, out outlet 206, and into conduit 34.

The fluid stream in conduit 34 is split between conduits 36 and 38. The fluid stream in conduit 38 passes through a fixed orifice device 50, and is fluidly coupled to the outlet 360 of the control pilot valve apparatus 300. The fluid stream in conduit 36 is passed through inlet 302, and into the lower, or second chamber 304. As the variable orifice 214 is presented at its maximum flow, the amount of fluid stream, and thus fluid pressure, entering into the chamber 304 is relatively large, causing the lower diaphragm 306 to move upwardly, as illustrated in FIGS. 1 and 6. The diaphragm 306 can move up to a point wherein the washer 328 comes into contact with the guide or coupler 362.

As the lower diaphragm 306 moves upwardly, the aperture or slot 332 in the stem 324 is moved upwardly so as to become increasingly aligned with the corresponding aperture or slot 356 of the yoke 350. Thus, the fluid in conduit 30 is able to pass through the inlet 358, and through the aligned apertures or slots 332 and 356 of the stem 324 and yoke 350, and into the upper or first chamber 310. The fluid is also able to exit outlet 360 of the control pilot valve apparatus, and into conduit 40. Due to the relatively free flow of the fluid, as described above, a relatively lesser amount of fluid and fluid pressure is introduced into the control chamber 120 of the main valve 100, permitting the main valve member 110 to be moved upwardly towards the main valve cover 118. It will be noted that in this situation, the pressure at P2 is greater than the pressure at P3 at the other side of fixed orifice device 50. This is due to a relatively high flow of fluid through variable orifice 214 and into the lower chamber 304 of the control pilot valve apparatus 300. Moreover, there is a pressure differential between the lower chamber 304 and the upper chamber 310, causing the diaphragm 306 to move upwardly, aligning slots 332 and 356, resulting in the hydraulic opening of the main valve member 110. Such would be the case, for example, when a large flow is required downstream from the main valve assembly 100.

As explained above, the design of the present invention controls high and low pressures by interacting with the variable orifice 214 or the variable orifice assembly 200 operably coupled to the main valve assembly 100. The variable orifice 214 opening increases or decreases with the main valve member 110 stroke upwardly or downwardly. The variable orifice 214 interacts with the fixed orifice 50 in the control pilot system 20. As system demand increases, the main valve 100 opens to respond to the increased system demand. As the main valve 100 opens, the flow area through the variable orifice 214 increases, which in turn increases the pressure drop, or pressure differential, across the fixed orifice device 50. The pressure drop, or differential, across this fixed orifice 50 is used to control the transition of system downstream pressure between the low and high pressure set points of the control pilot valve apparatus 300.

In the illustrated design, the low pressure set point is set and adjusted by turning screw 312, which serves to compress or decompress spring 320, thus limiting the range of motion or travel of the lower diaphragm 306 and stem 324. The upper or high pressure adjustment is made by selectively turning screw 334, thus compressing or decompressing spring 342, and thus affecting the range of travel of the upper diaphragm 346 and the yoke 350. Such adjustments set the low and high pressure set points of the system 10.

The variable orifice 214 can be customized to control the rate of change between the low and high pressure settings. If the flow area through the variable orifice 214 is profiled to increase quickly (relative to main valve member 110 stroke), the transition between low and high pressure set points will likewise change quickly. For example, for a variable orifice 214 where the flow area through the variable orifice quickly changes, the transition between the low pressure set point and the high pressure set point would occur fairly quickly between the low and high flow conditions resulting in a relatively steep curve between the low and high set points. For instance, for a given valve size, such as an eight-inch valve, pressure change could occur within a two hundred gallon-per-minute flow span, or a relatively steep curve. However, if the flow area through the variable orifice 214 is profiled to increase slowly, relative to main valve member 110 stroke, then the transition between the low and high pressure set points will likewise change slowly. For example, a variable orifice 214 where the flow area through the variable orifice slowly changes, then the same low-high pressure transition would occur fairly slowly between the low and high flow conditions. In this case, the change might occur within a five hundred gallon-per-minute flow span, or a relatively shallow curve. Changing the variable flow area geometry of the variable orifice 214 can be used to change or customize the pressure curve profile between the low and high flow set points.

Figure 7:
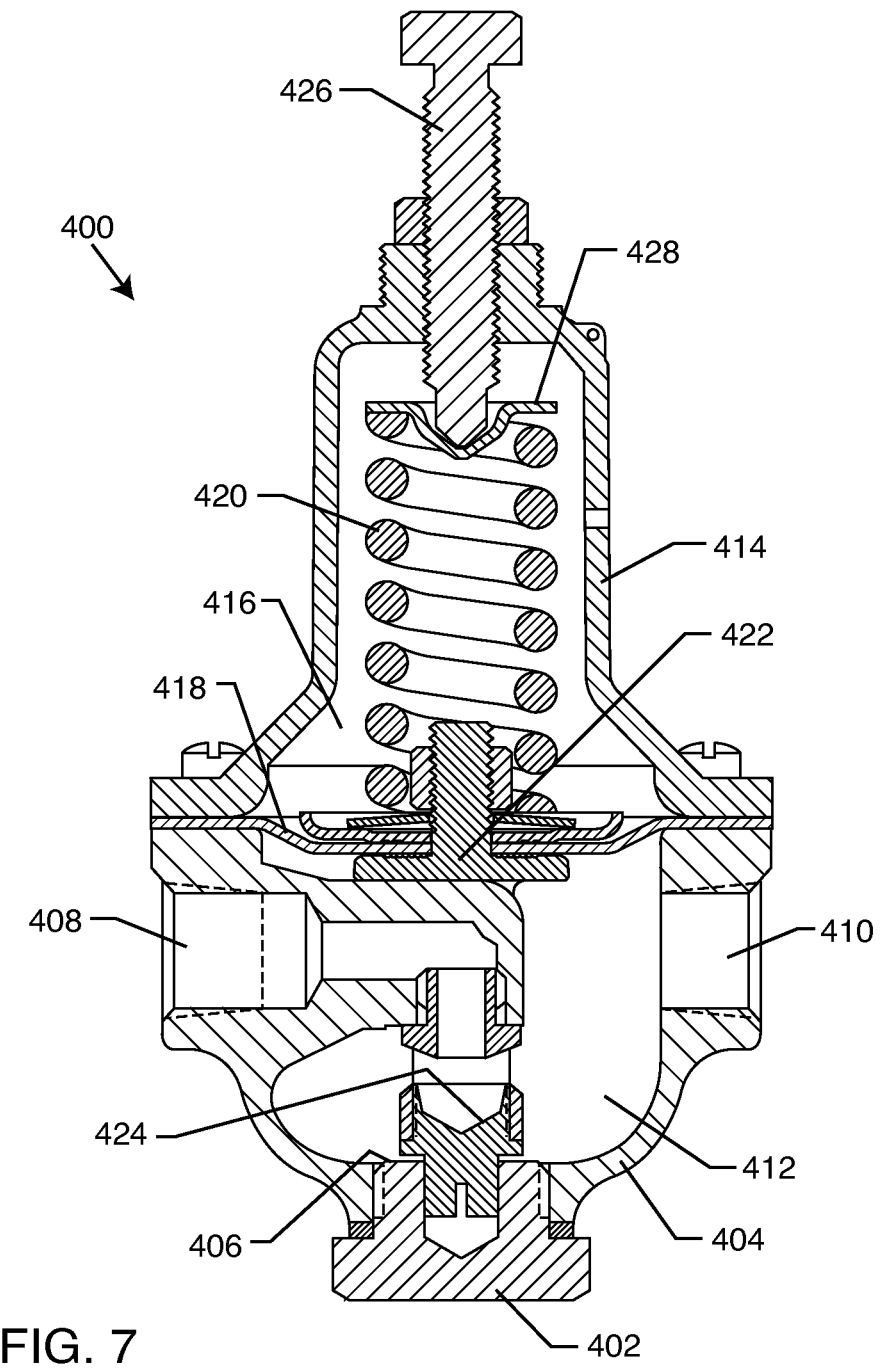
FIG. 7 is a cross-sectional view of a pressure regulator apparatus used in accordance with the present invention.

With reference now to FIGS. 1 and 7, as mentioned above, fluid stream through conduit 26 may be passed through pressure regulator apparatus 400 before being passed into the variable orifice assembly 200. The pressure regulator apparatus 400 is another means of customizing and controlling the rate of change between the low and high pressure settings, so as to change or customize the pressure curve profile between the low and high flow set points. The pressure regulator apparatus generally comprises a plug 402 connected to a seat assembly or body 404, and supporting a disc retainer assembly 406. The body 404 defines an inlet 408 and an outlet 410. A chamber or passageway 412 is disposed between the inlet and outlet 408 and 410. A cover or upper body 414 defines a chamber 416, typically exposed to atmosphere. A diaphragm 418 is disposed between chambers 412 and 416. The diaphragm 418 is operably connected or coupled to a spring 420 and a yoke 422. A portion of the yoke defines a passageway 424 alignable with a passageway of the inlet 408, so as to permit fluid to flow therethrough. However, depending upon the position of the yoke 422, the fluid is either allowed to pass through into passageway or chamber 412, and out outlet 410, or is restricted or even closed from passing into passageway or chamber 412.

The set point or adjustment is made by a screw 426 being turned clockwise or counterclockwise, which applies a force to spring guide 428, causing the spring 420 to be compressed or relaxed. This impacts the position of diaphragm 418, and yoke 422. This also establishes a range of travel for the diaphragm 418, if any, so as to produce a relatively constant flow or pressure through outlet 410, represented by P1 in FIG. 1. The pressure regulator device 400 is used to control the pressure at P1. This in turn customizes the profile of a pressure regulation ramp when regulating between low and high pressure set points. When pressure at P1 is equal to, or nearly equal to, the pressure at the main valve inlet 104, then the pressure ramp is at its steepest. When the pressure at P1 is appreciably lower than the main valve inlet 104 pressure, then the pressure ramp is shallower.

Figure 8:
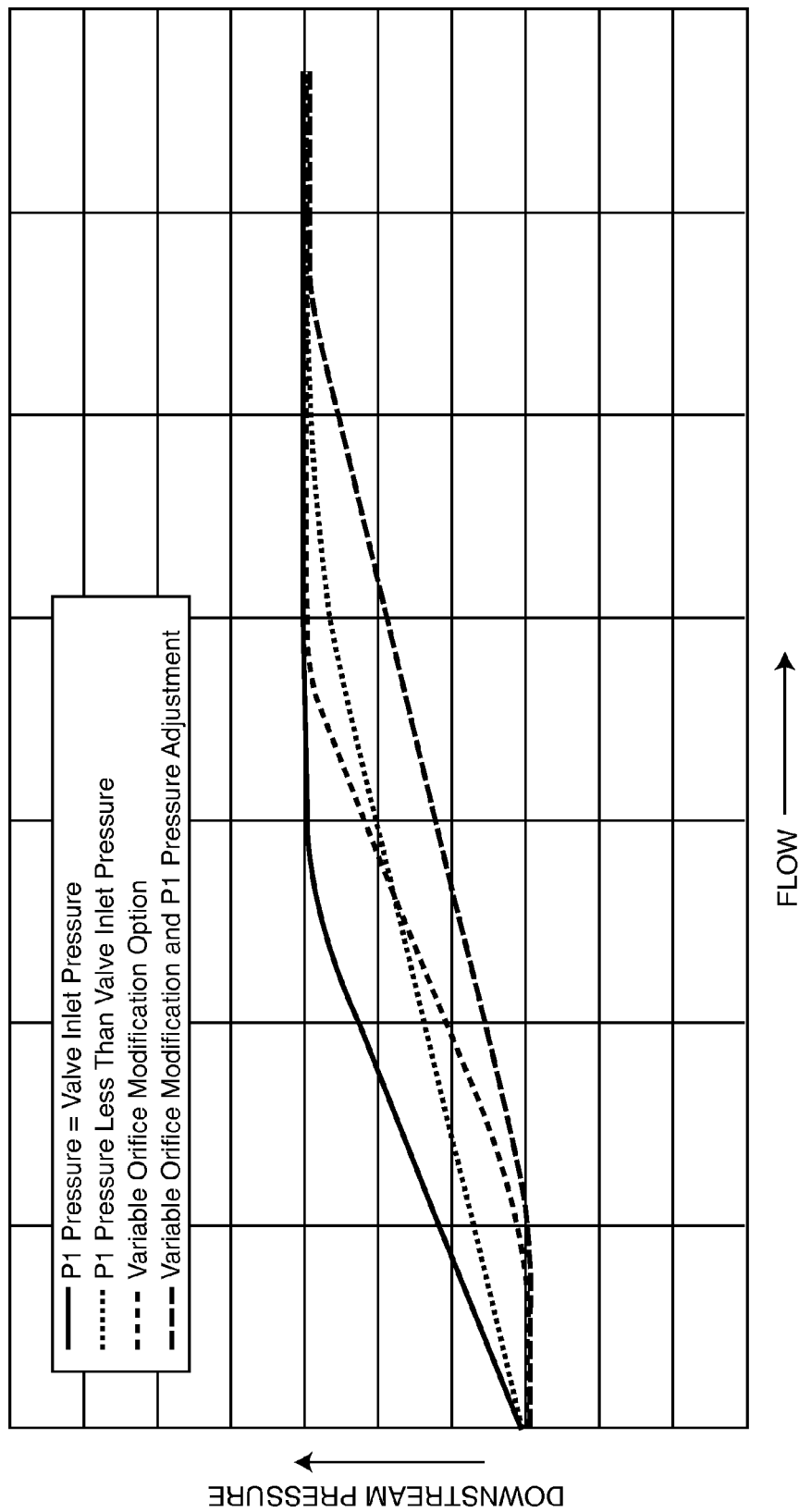
FIG. 8 is a diagram illustrating pressure profiles created by modifying the variable orifice assembly and implementing the pressure regulator apparatus.

With reference now to FIG. 8, a diagram illustrates the downstream pressure as compared to flow through the main valve 100. Thus, when the P1 pressure equals the main valve inlet pressure 104, a relatively steep curve, shown by the solid line results. When the pressure at P1 is less than the main valve inlet 104 pressure, illustrated by the dotted lines, a shallower curve or profile is created. This occurs due to the use of the pressure regulator apparatus 400. In FIG. 8, a pressure profile is illustrated wherein the variable orifice 214 is modified (illustrated by the dashed line). Including both the pressure regulator apparatus 400 as well as modifying the variable orifice 214 results in a relatively shallow profile, illustrated by the elongated dashed line.

Figure 9:
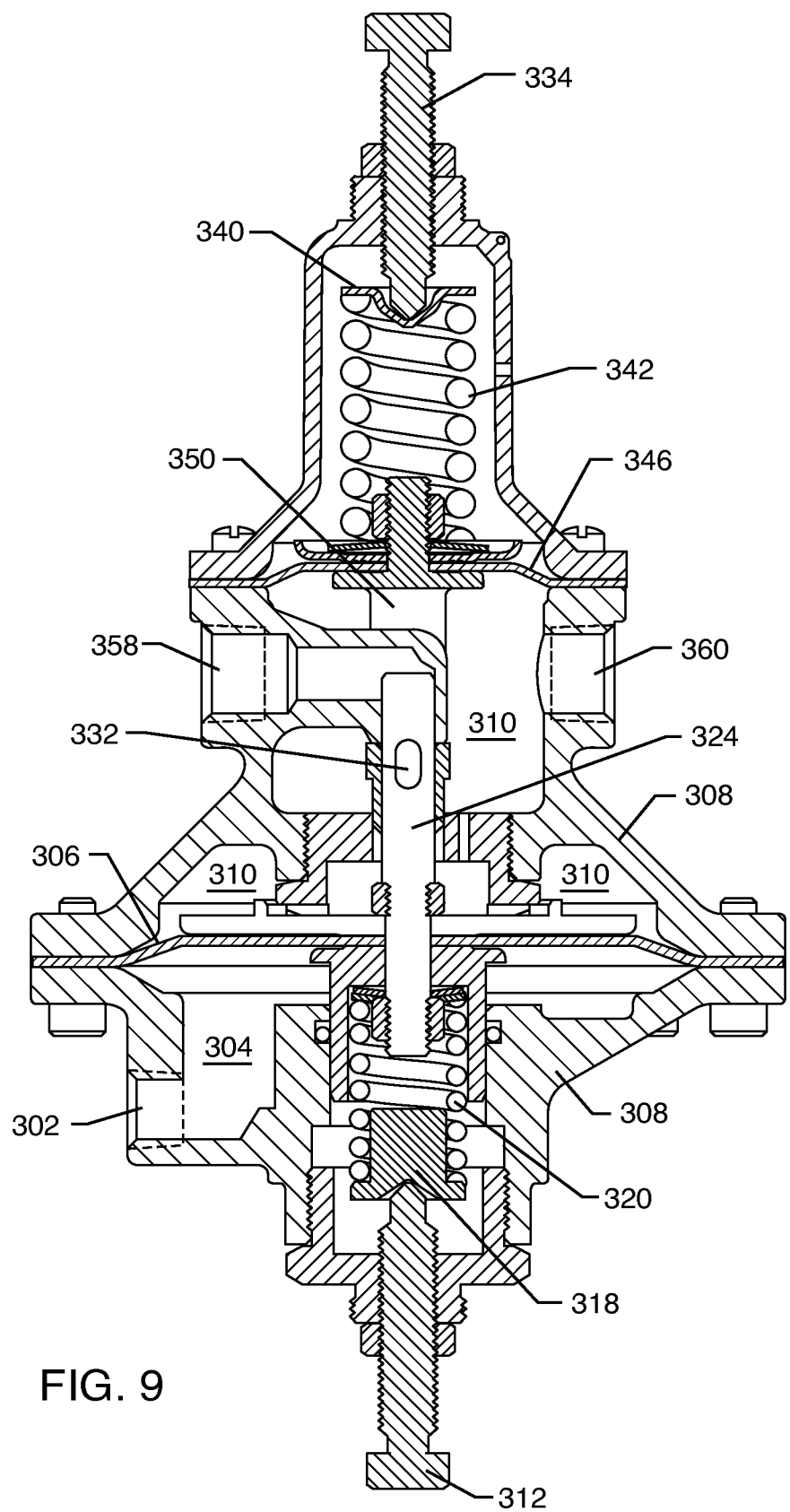
FIG. 9 is a cross-sectional view of the control pilot valve apparatus in a high pressure state.

Referring now to FIGS. 1 and 9, at some point during the high flow or high demand situation, the pressure at P3 will begin to increase, due to the pressure of the stream generated at inlet 42, and passed through conduit 40. In such a case, the pressure in upper chamber 310 of the control pilot valve apparatus 300 will begin to increase.

As the pressure in the first chamber 310 begins to increase, upper diaphragm 346 will be forced to move upwardly, pulling yoke 350 upwardly with it, and constricting the passageway through slots or apertures 332 and 356. In fact, when diaphragm 346 is moved to its upper most position, the yoke 350 may be sufficiently raised so that its aperture or slot 356 is no longer aligned whatsoever with the slot or aperture 332 of the stem 324, such that fluid is not allowed to pass therethrough. Such is illustrated in FIG. 9.

As described above, adjustment screw 334 is rotated so as to relax or compress spring 342, increasing or decreasing the range of potential motion and travel of the diaphragm 346 and the yoke 350. In this manner, the high pressure set point can be adjusted and set to a predetermined level.

Figure 10:
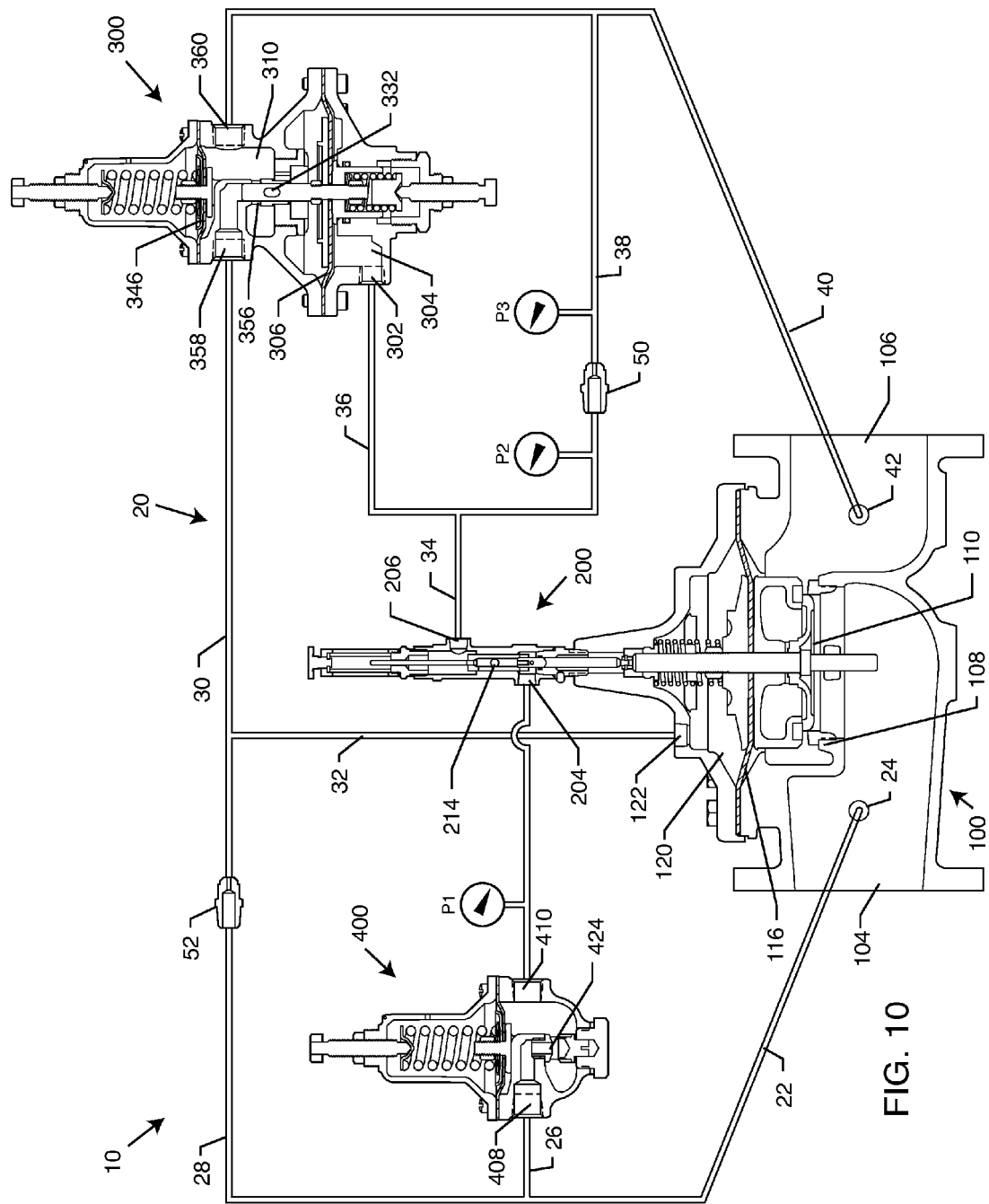
FIG. 10 is a schematic illustration of the system of the present invention in a low flow state.

With reference now to FIG. 10, when the pressure within the upper or first chamber 310 of the control pilot valve apparatus 300 is sufficient so as to reach the high pressure set point, as described above, back fluid flow and pressure will build up in conduits 30 and 32, causing an increase in fluid flow and pressure into the inlet port 122 and control chamber 120 of the main valve assembly 100, preventing the main valve member 110 from moving upwardly to any greater extent, or building up sufficient pressure within the control chamber 120 so as to push the diaphragm 116, and thus the main valve member 110, downwardly towards seat 108. This reduces the flow through the main valve 100, and reduces the downstream pressure such that it is below the high pressure set point.

With continuing reference to FIG. 10, the system 10 is illustrated in a low flow or low demand state, wherein the main valve member 110 is moved towards the main valve seat 108, so that fluid flow through the main valve 100 is restricted, or there is a relatively low flow through the main valve assembly 100.

Figure 11:
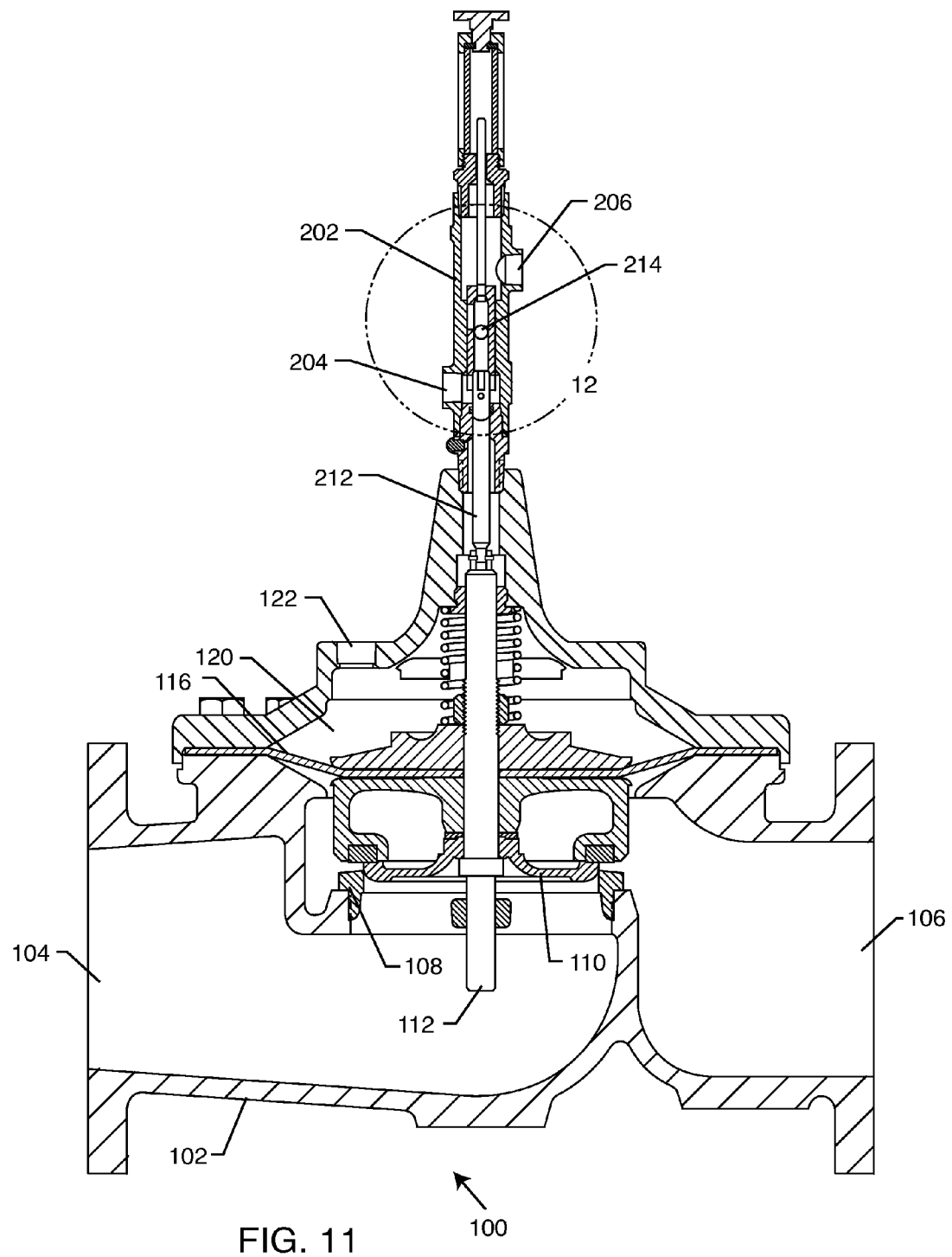
FIG. 11 is a cross-sectional view of the main valve and variable orifice assembly in the low flow state.
Figure 12:
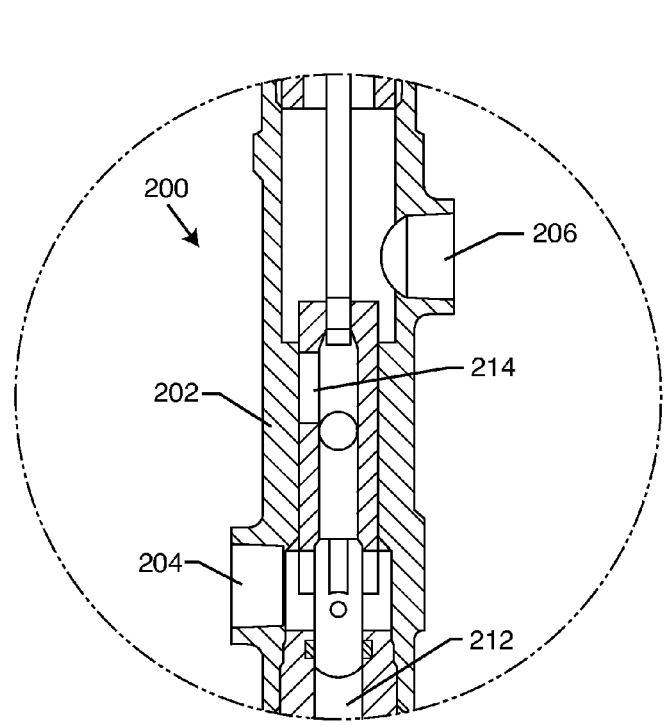
FIG. 12 is an enlarged cross-sectional view of area "12" of FIG. 11, illustrating a variable orifice thereof in a closed position.

With reference now to FIG. 11, in such a low flow or low demand situation, the main valve member 110 moves towards its closed position adjacent to main valve seat 108. Thus, variable orifice assembly stem 212 is moved downwardly, occluding variable passage 214, limiting or restricting, or even preventing, fluid flow therethrough and out outlet 206. This can be seen in FIG. 12.

Figure 14:
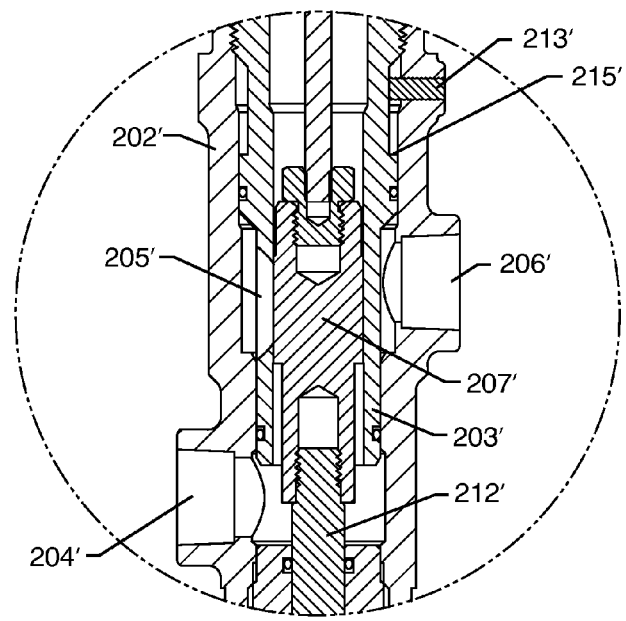
FIG. 14 is an enlarged cross-sectional view of area "14" of FIG. 1 3.
Figure 15:
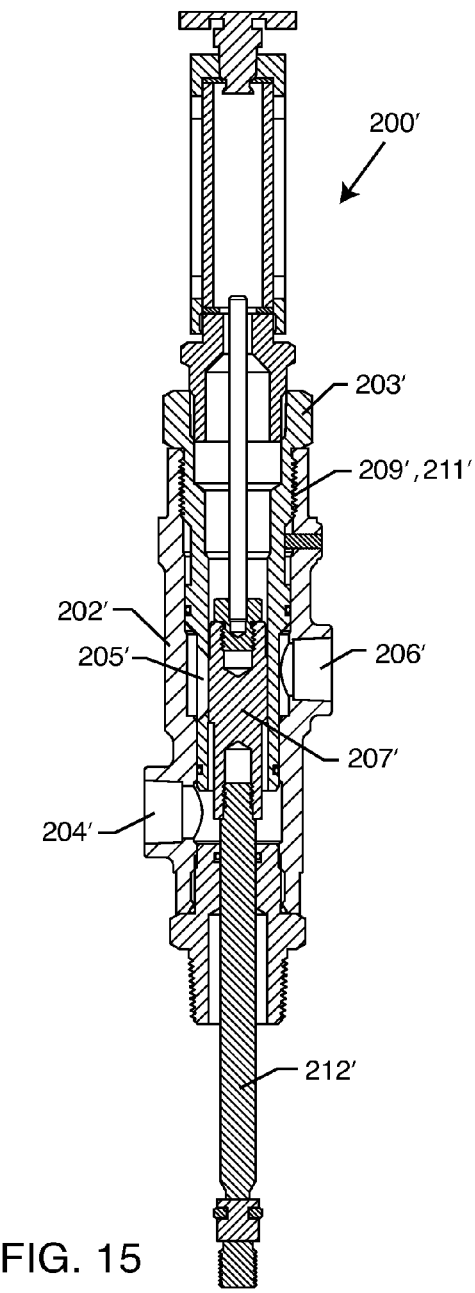
FIG. 15 is a cross-sectional view similar to FIG. 13, but illustrating a sleeve thereof moved into a different profile position.

With reference now to FIGS. 13-15, in the alternative embodiment of the variable orifice assembly 200', when the stem 212' is moved downwardly, section 207' is moved downwardly as well, such that the wider diameter portion of the section 207' is in contact with the sleeve 203', either reducing or preventing fluid flow from the assembly inlet 204' and the sleeve slot 205', and thus outlet 206'. It will be noted that the sleeve 203' has been adjustably moved when comparing the variable valve orifice assembly 200' illustrated in FIGS. 13 and 15. As discussed above, movement of the sleeve 203', either into or out of the housing 202', adjusts the position of the sleeve slot 205', and thus impacts the resulting fluid flow profile. However, in both FIGS. 13 and 15, the stem 212' has been moved downwardly sufficiently that there is little, if any, fluid flow from the housing inlet 204' to the outlet 206'.

Figure 16:
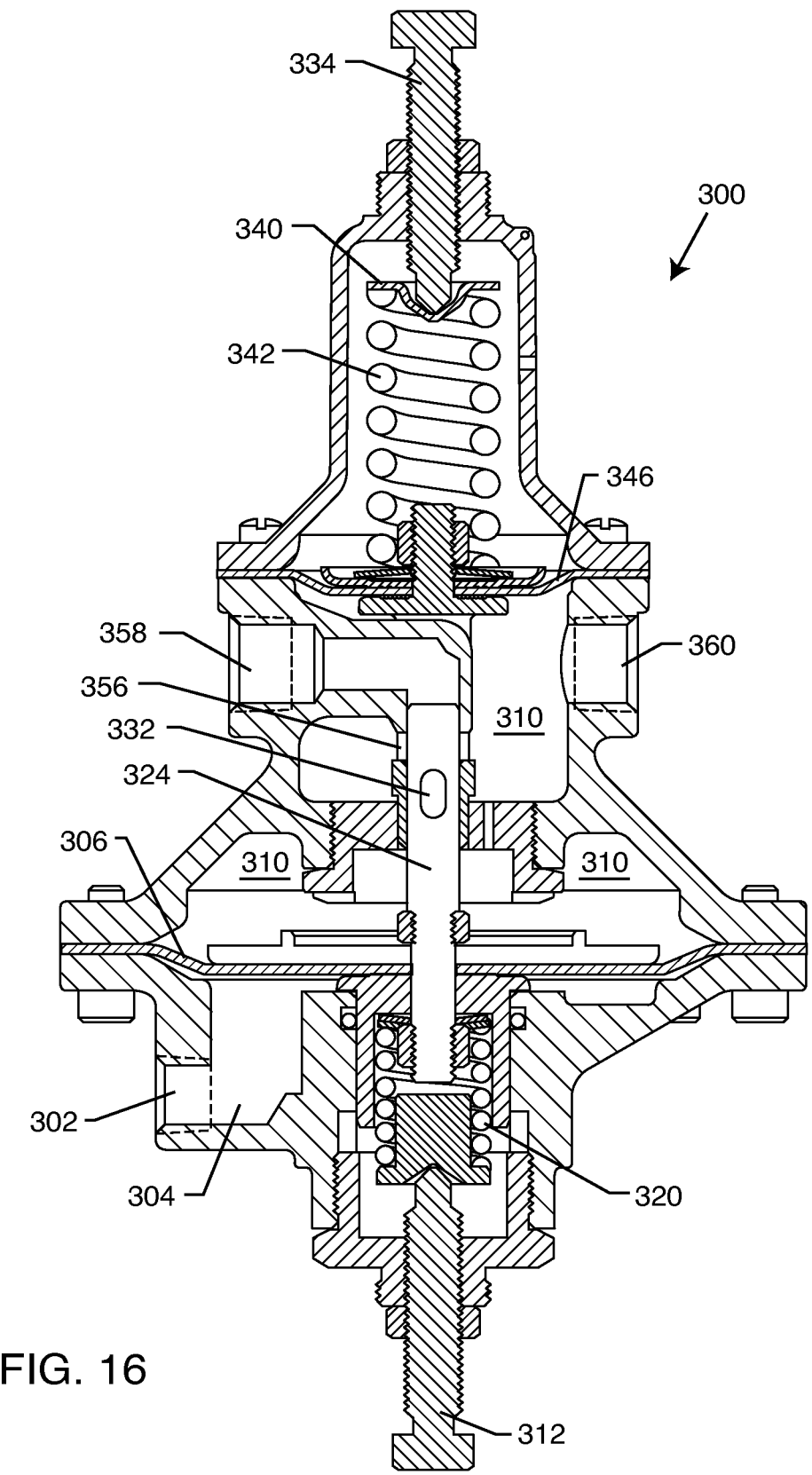
FIG. 16 is a cross-sectional view of the control pilot valve apparatus used in accordance with the present invention in a low flow state.

This results in a lower fluid flow and pressure at P2, and lower chamber 304 of the control pilot valve apparatus 300. The lower pressure in chamber 304 naturally biases the lower diaphragm 306 downwardly, as can be seen in FIG. 16. This causes the stem 324 to move downwardly, moving the slot 332 thereof out of alignment with the yoke opening 356. This restricts, or even prevents in some cases, fluid entering inlet 358 from passing into upper chamber 310, and out outlet 360. This causes a back pressure, which increases in control chamber 120 of the main valve assembly 100, preventing the main valve member 110 from moving upwardly, or if sufficient pressure is present in control chamber 120, moving the main valve member 110 downwardly toward seat 108 to restrict the flow of fluid through the main valve 100. Moreover, the reduction in pressure in upper chamber 310 cause the upper diaphragm 346 to either remain in position, or move downwardly, as illustrated in FIG. 11, depending upon the pressure in chamber 310.

The passage area through the variable orifice 214 changes with the change in the main valve member 110 position. Main valve number 110 position changes in response to system flow demand conditions, opening as demand increases and closing as demand decreases. Restricted flow through the variable orifice 214 causes a low pressure drop, or pressure differential, through the fixed orifice 50, which causes restricted flow through the control pilot valve apparatus 300. This action causes the main valve 100 to throttle closed towards a lower pressure set point. The lower pressure set point is established by adjusting set screw 312, which compresses or relaxes spring 320, directly affecting the range of travel and motion of lower diaphragm 306.

However, when system flow demand increases, the main valve 100 responds by opening, which increases flow area through the variable orifice 214, as described above. Increased flow through the variable orifice 214 increases the pressure drop, or differential, across fixed orifice 50. This action causes the main valve 100 to throttle open towards the higher set point.

Due to the varying flow of fluid through the variable orifice 214, the pressure acting on the lower diaphragm 306 also varies. When the pressure on the top of the lower diaphragm, in chamber 310, is equal to or slightly higher than the pressure under the lower diaphragm, in chamber 304, then hydraulic forces bias the travel of the slotted stem 324 in a direction that reduces the flow area through the slot 332. This action, as described above, causes the main valve 100 to throttle towards the low pressure, or low flow, set point.

However, as pressure under the lower diaphragm in chamber 304 increases relative to pressure above the lower diaphragm 306 in chamber 310, then hydraulic forces bias the travel of the slotted stem 324 in a direction that increases the flow area through the slot 332. This action causes the main valve 100 to throttle towards the high pressure, or high flow, set point. As described above, when the pressure in the upper chamber 310 is sufficiently great, the upper diaphragm 346 moves upwardly to its selected high pressure set point, moving the yoke upwardly, and restricting the flow through the slot 332 and yoke passageway 356, increasing the pressure in the control chamber 120, and either preventing the main valve member 110 from moving upwardly any further, or forcing the main valve member 110 downwardly towards a more closed position. In all flow conditions (low and high) the stem 324 and yoke 350 are independently moved and do not interfere with one another's travel. The exposed slot area, or variable passageway, through the control pilot valve apparatus 300 varies with changing system conditions causing flow to modulate. This arrangement allows the main valve 100 to modulate between the pre-selected high and low pressure set points established at the control pilot valve apparatus 300, as described above. More particularly, it is the selection of the springs 320 and 342 acting on the lower and upper diaphragms 306 and 346 which create the high and low pressure set points. The low pressure set point is determined by the applied force of the lower spring 320. Decreasing the spring force of the lower spring 320 lowers the downstream pressure. Increasing the spring force of the upper spring 342 raises the downstream pressure. The upper spring 342 is used to set the system pressure for normal or high flow conditions, while the lower spring 320 is used to set the system pressure conditions for low flow conditions.

Although several embodiments have been described in some detail for purposes of illustration, various modifications may be made without departing from the scope and spirit of the invention. Accordingly, the invention is not to be limited, except as by the appended claims.

What is claimed is:

1. A method of controlling fluid pressure downstream from a main valve, comprising the steps of:
providing a main valve having a fluid inlet and a fluid outlet, the main valve being configured to open to increase fluid flow therethrough, and close to reduce fluid flow therethrough;
associating a variable orifice with the main valve such that the flow area of the variable orifice changes as the main valve position changes;
setting an upper pressure set point while selectively limiting a range of travel of a high pressure diaphragm of a control pilot valve apparatus, and setting a lower pressure set point by selectively limiting a range of travel of a low pressure flexible diaphragm of the control pilot valve apparatus;

passing a fluid stream, having a pressure proportional to a fluid inlet pressure of the main valve, to an inlet of the variable orifice;

placing a fixed orifice within a pilot control system associated with the main valve such that an inlet of the fixed orifice is in fluid communication with an outlet of the variable orifice;

detecting a pressure differential between the inlet and an outlet of the fixed orifice; and hydraulically opening or closing the main valve in response to the detected fixed orifice pressure differential;

using the control pilot valve apparatus, in fluid communication with the variable orifice, the fixed orifice, and the main valve, to detect the pressure differential between the inlet and outlet of the fixed orifice and open or close the main valve.

2. The method of claim 1, including the step of passing the fluid stream through a pressure regulator passageway before passing the fluid stream through the variable orifice.

3. The method of claim 2, including the step of adjusting the pressure regulator passageway in order to modify a downstream flow pressure regulation profile.

4. A method of controlling fluid pressure downstream from a main valve, comprising the steps of:

providing a main valve having a fluid inlet and a fluid outlet, the main valve being configured to open to increase fluid flow therethrough, and close to reduce fluid flow therethrough;

associating a variable orifice with the main valve such that the flow area of the variable orifice changes as the main valve position changes;

generating a fluid stream having a pressure proportional to an inlet of the main valve and in fluid communication with a first chamber of a control pilot valve apparatus and a hydraulic control chamber of the main valve and an inlet of the variable orifice;

placing an inlet of a fixed orifice in fluid communication with an outlet of the variable orifice;

passing at least a portion of a fluid stream exiting the outlet of the variable orifice to a second chamber of the pilot valve apparatus;

using the control pilot valve apparatus in fluid communication with the variable orifice, the fixed orifice, and the main valve to detect the pressure differential between the inlet and outlet of the fixed orifice;

opening or closing a passageway of the first fluid chamber in response to pressure differentials between the first and second chambers of the control pilot valve apparatus; and hydraulically opening or closing the main valve in response to the detected fixed orifice pressure differential, including hydraulically opening the main valve when fluid flow through the first chamber of the control pilot valve apparatus is unimpeded, and hydraulically closing the main valve as fluid flow through the first chamber of the control pilot valve apparatus is restricted.

5. A method of controlling fluid pressure downstream from a main valve, comprising the steps of:

providing a main valve having a fluid inlet and a fluid outlet, the main valve being configured to open to increase fluid flow therethrough, and close to reduce fluid flow therethrough;

associating a variable orifice with the main valve such that the flow area of the variable orifice changes as the main valve position changes;

passing a fluid stream, having a pressure proportional to a fluid inlet pressure of the main valve, to an inlet of the variable orifice;

placing an inlet of a fixed orifice in fluid communication with an outlet of the variable orifice;

using a control pilot valve apparatus in fluid communication with the variable orifice, the fixed orifice, and the main valve to detect the pressure differential between the inlet and outlet of the fixed orifice;

hydraulically opening or closing the main valve in response to the detected fixed orifice pressure differential; and setting an upper pressure set point while selectively limiting a range of travel of a high pressure diaphragm of the pilot valve apparatus, and setting a lower pressure set point by selectively limiting a range of travel of a low pressure flexible diaphragm of the pilot valve apparatus.

6. A method of controlling fluid pressure downstream from a main valve, comprising the steps of:

providing a main valve having a fluid inlet and a fluid outlet, the main valve being configured to open to increase fluid flow therethrough, and close to reduce fluid flow therethrough;

associating a variable orifice with the main valve such that the flow area of the variable orifice changes as the main valve position changes;

generating a fluid stream having a pressure proportional to an inlet of the main valve and in fluid communication with a first chamber of a pilot valve apparatus and a hydraulic control chamber of the main valve;

passing a fluid stream, having a pressure proportional to a fluid inlet pressure of the main valve, to an inlet of the variable orifice;

passing at least a portion of a fluid stream exiting the outlet of the variable orifice to a second chamber of the control pilot valve apparatus;

opening or closing a passageway of the first fluid chamber in response to pressure differentials between the first and second chambers;

placing a fixed orifice within a pilot control system associated with the main valve such that an inlet of the fixed orifice is in fluid communication with an outlet of the variable orifice;

detecting a pressure differential between the inlet and an outlet of the fixed orifice; and hydraulically opening or closing the main valve in response to the detected fixed orifice pressure differential, including the steps of hydraulically opening the main valve when fluid flow through the first chamber is unimpeded, and hydraulically closing the main valve as fluid flow through the first chamber of the pilot valve apparatus is restricted;

using the control pilot valve apparatus, in fluid communication with the variable orifice, the fixed orifice, and the main valve, to detect the pressure differential between the inlet and outlet of the fixed orifice and open or close the main valve.

7. The method of claim 6, including the step of adjusting the pressure regulator passageway in order to modify a downstream flow pressure regulation profile.

* * * * *